United States Patent [19]

Madoche et al.

[11] Patent Number: 4,483,363
[45] Date of Patent: Nov. 20, 1984

[54] COMPRESSOR VALVE

[76] Inventors: Robert D. Madoche, Box 916, Devon, Alta., Canada, T0C 1E0; Dan C. Madoche, 34 Winchester Ave., Spruce Grove, Alta., Canada, T0E 2C0; Neil O. Lepps, 51028 Range Rd., 221 Sherwood Park, Alta., Canada, T8E 1G8; Dwayne R. Zukowski, R.R. 1, Leduc, Alberta, Canada, T9E 2X1

[21] Appl. No.: 534,247

[22] Filed: Sep. 21, 1983

[51] Int. Cl.³ .............................................. F16K 15/08
[52] U.S. Cl. ............................ 137/329.04; 137/512.1; 137/516.15
[58] Field of Search ........... 137/512.1, 516.15, 516.23, 137/329.04

[56] References Cited

U.S. PATENT DOCUMENTS

| 191,812 | 6/1877 | O'Neill | 137/516.17 |
| 768,042 | 8/1904 | Ginaca | 137/516.23 |
| 1,341,145 | 5/1920 | Meyer . | |
| 1,613,145 | 1/1927 | Trump . | |
| 2,333,288 | 11/1943 | Benzel . | |
| 2,657,708 | 11/1953 | Kamm et al. . | |
| 2,726,673 | 12/1955 | Russell . | |
| 3,158,175 | 11/1964 | Jaklitsch . | |
| 3,371,678 | 3/1968 | Rydberg | 137/512.1 X |
| 3,412,563 | 11/1968 | Sharp Jr. . | |
| 4,018,247 | 4/1977 | Carr . | |
| 4,036,251 | 7/1977 | Hartwick et al. . | |
| 4,130,131 | 12/1978 | Kucenty . | |

FOREIGN PATENT DOCUMENTS

| 877172 | 8/1971 | Canada . | |
| 1058130 | 7/1979 | Canada . | |
| 1069019 | 1/1980 | Canada . | |
| 1069020 | 1/1980 | Canada . | |
| 2726 | 2/1878 | Fed. Rep. of Germany ... | 137/512.1 |
| 2071818 | 9/1981 | United Kingdom ............ | 137/512.1 |

Primary Examiner—Robert G. Nilson
Attorney, Agent, or Firm—Cushman, Darby & Cushman

[57] ABSTRACT

A compressor valve with annular valve members or rings instead of the usual spring-urged engagement of the rings with the valve seat, the rings are drawn into engagement with the seat by air or other gas passing through the valve in a direction reverse to that opening the valve. Thus, on reversal of the flow, the rings are virtually instantly brought into engagement with the seat without the need for springs bringing the valve rings into closed state. Both faces of the valve rings are identical. When one face is worn, the rings can be turned over to utilize the second valve face. The advance is in simplified structure, increased reliability and in longer operation life of the valve rings.

10 Claims, 10 Drawing Figures

COMPRESSOR VALVE

THE FIELD OF INVENTION

The present invention relates to compressor valves sometimes also referred to as "plate valves". The valves of this type are associated with compressors or vacuum pumps, for instance with piston-type compressors wherein a piston reciprocates within a cylinder to draw air or other gaseous substance into the cylinder and to then discharge same in a compressed state to a suitable means for storage of the compressed gaseous medium. The compressors of this type must be provided at least with one intake valve and one discharge valve. The valves can also be referred to as "automatic one-way valves" as distinguished from the mechanically actuated type. That is to say, the valves are designed to allow the passage of the gaseous medium from one end of the valve to the other but to close automatically when the direction of flow of the gaseous medium is reversed.

Thus, if an intake valve is associated with a respective piston compressor, it allows passage of the respective gaseous medium in a direction towards the cylinder. The direction can also be referred to in functional terms as being the direction of movement of the piston as it moves on intake of the gaseous medium towards its bottom dead centre.

When the piston reaches its bottom dead centre, its movement becomes reversed with the result that the gaseous medium previously drawn into the cylinder by the piston now becomes compressed and discharged from the cylinder. The intake valve now must close while the discharge valve (which had been closed during the suction step of the compressor) now opens allowing the discharge of the gaseous medium either to the atmosphere or to a suitable storage means, depending on the particular application of the compressor.

Thus, the two valves alternate their operational stage in accordance with the instant movement of the piston of the cylinder.

There may be other applications for this type of valve. For convenience, however, the valves described hereinafter will be referred to as "compressor valves" since they are predominantly used in the field of the compressors.

DESCRIPTION OF THE DRAWINGS

Most recent prior art compressor valves and an exemplary embodiment of a compressor valve according to the present invention will be described with reference to the accompanying drawings in which.

DESCRIPTION OF PRIOR ART

Figure 1:
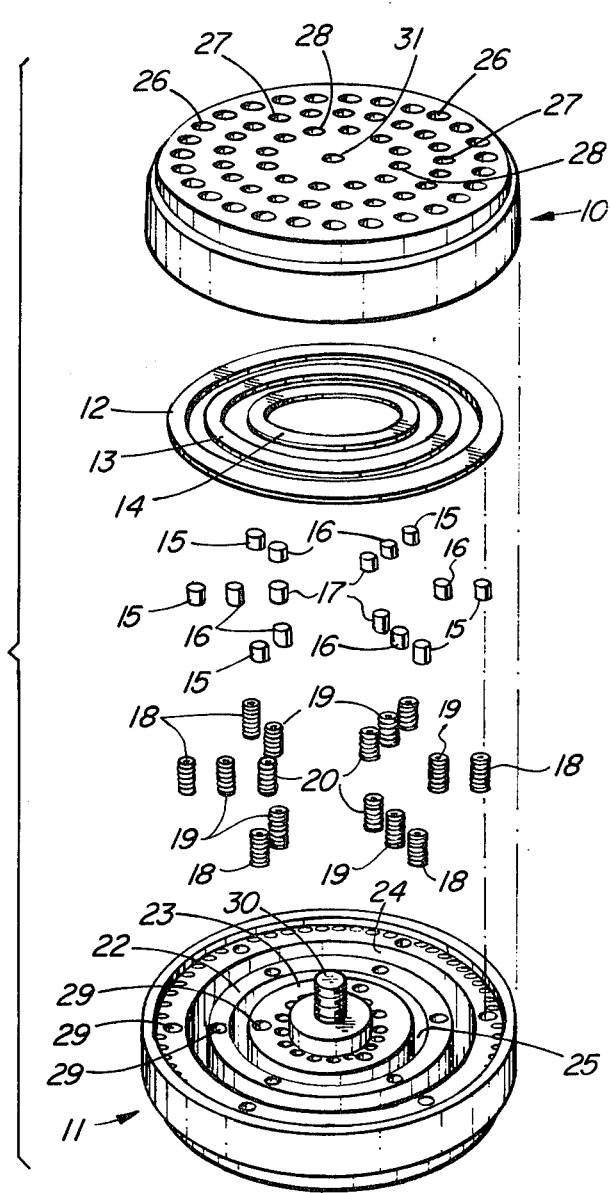
FIG. 1 is a simplified perspective exploded view of one type of a prior art compressor valve or plate valve.
Figure 2:
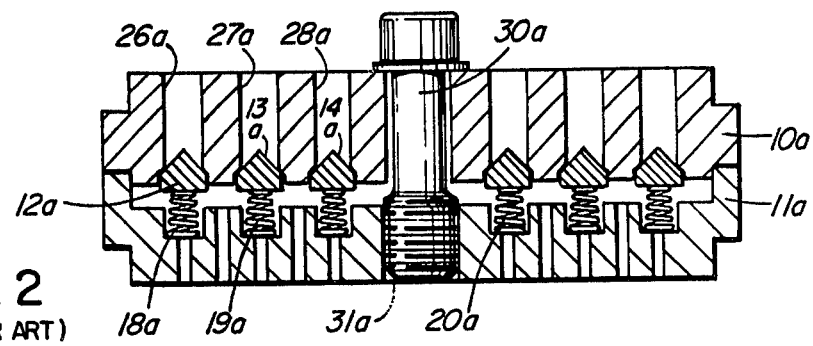
FIG. 2 is a simplified cross-sectional view of a modified version of a prior art compressor valve generally similar to that of FIG. 1.

Turning firstly to FIGS. 1 and 2 of the accompanying drawings, and in particular to FIG. 1, a typical compressor valve of prior art is comprised of a disc-shaped valve seat 10 and a disc-shaped valve guard 11, the two being arranged to be firmly secured to each other to form a disc-shaped body of the valve. The inner faces of the valve seat 10 and valve guard 11 define therebetween a valve chamber which houses valves or valve plates 12, 13 and 14 and the spring assembly associated therewith and formed by a plurality of buttons 15 operatively associated with the valve plate 12 having the largest diameter. Buttons 16 are similarly arranged to abut upon the intermediate valve plate 13 and the innermost buttons 17 are disposed underneath and in engagement with the valve plate 14 having the smallest diameter. There are only 3 buttons 18, whereas the number of the remaining buttons 15, 17, is 6.

Each of the buttons 15, 16, and 17 is disposed on top of a coil spring such as coil springs 18, 19 and 20, respectively.

The valve guard 11 has a set of 3 concentric support surfaces 21, 22 and 23 which are all of annular configuration complementary with the annular shape of the valve plates 12, 13 and 14, respectively.

The grooves between the supporting surfaces 21, 22 and 23 are designated with reference numerals 24, and 25, the latter being the slot having the smaller diameter. At the downwardly facing axial end of the valve guard 11, the face not being visible in FIG. 1, a set of radial ribs holds the annular ribs forming the support surfaces 21, 22, 23 in a concentric arrangement to thus maintain uniform width of each of the grooves 24, 25.

The valve seat 10 is provided with a total of 3 annular rows of circular passages. The outermost row of passages 26 has the same pitch diameter as the medium diameter of the valve plate 12. The diameter of the passages 26 is smaller than the width of the associated valve plate 12, the last mentioned width being generally identical with the width of the corresponding supporting surface 21 in the valve guard 11. The remaining rows of openings 27 and 28 are similarly disposed on pitch circles corresponding in size to the valve plates 12, 13 and 14.

It will be appreciated from FIG. 1 that, on assembly, the annular spaces between the respective rows of passages 26, 27 and 28 are disposed directly above the grooves 24 and 25.

Turning back to the valve guard 11, it will be observed that it also has machined in it a number of cylindric openings such as cylindric openings 29, each of which provides a seat for the respective one of the springs 18, 19 and 20. The threaded stem 30 protruding from the top surface of the valve guard 11 is arranged to engage the thread in a threaded central opening 31 for suitable securement of the valve seat 10 to the valve guard 11 with the described parts disposed within the valve chamber.

The arrangement of FIG. 1 has several drawbacks. In particular, it is relatively expensive to produce due to a relatively large number of parts required. Furthermore, springs such as springs 18, 19 or 20 have the tendency to break. The buttons such as buttons 15, 16 and 18 present further manufacturing expense. In order to assure a good sealing effect, the valve plates 12, 13 and 14 which are made both from metallic and non-metallic materials must be accurately dimensioned in order to effectively seal the porting of the valve. Broken springs give rise to serious damages to the accurately machined interior of the valve chamber thus often impairing the operation of the valve and sometimes even rendering the valve completely inoperative.

The embodiment of prior art shown in FIG. 2 presents certain improvement over what is shown in FIG. 1. A number of the parts of the arrangement in FIG. 2 corresponds to that of FIG. 1 and is therefore referred to with the same reference numerals indexed with "a". Thus, there is a valve seat 10a, a valve guard 11a, a number of passages 26a, 27a and 28a and, finally, a threaded stem 30a received in a central opening 31a. The latter two elements correspond in function to the stem 30 and to the central opening 31 of the embodiment of FIG. 1, even though their position relative to the valve seat 10a and the valve guard 11a is reversed.

Instead of flat valve plates 12, 13 and 14 shown in FIG. 1, the embodiment of FIG. 2 has a set of 3 valve rings 12a, 13a and 14a. The top surface of the valve rings 12a, 13a and 14a is not flat as in the embodiment of FIG. 1. Instead, it is bevelled to form two conical surfaces, one having its apex above and the other below the respective ring. The two conical surfaces define a generally centrally disposed ridge. The peripheral grooves machined in the valve seat 10a and receiving the respective rings 12a, 13a and 14a are provided with correspondingly shaped seats at the lowermost end of each of the peripheral grooves. In the representation of FIG. 2, of course, all of the peripheral grooves in valve seat 10a coincide with the respective passages 26a, 27a and 28a.

The improvement of the arrangement of FIG. 2 over that of FIG. 1 is seen in the omission of the buttons 15, 16 and 18 and also in the provision of the bevelled surfaces much in the fashion of the bevelled closing surfaces of a combustion engine valve. The drawback is in that the arrangement still requires a large number of springs 18a, 19a and 20a having the tendency to break as referred to above. The valve rings 12a, 13a and 14a have a relatively short operational period and require frequent replacement as the section of their surfaces contacting the respective seating surfaces in the passage grooves of the valve seat 10a wear out.

In operation, the valve allows the passage of air or other gas from top to bottom of FIG. 2. As the associated compressor draws air in (assuming that the shown valve is an intake valve), the pressure of the springs 18a, 19a and 20a is overcome and the air flows through passages 26a, 27a and 28a, then through the respective slots, along the top surface of now open valve rings 12a 13a and 14a and into the passages 24a and 25a forming functional counterparts of the grooves 24 and 25 of the embodiment of FIG. 1. On reversal of the gas flow, the springs 18a, 19a and 20a close the grooves in the valve seat 10a thus preventing passage of air upwards of FIG. 2.

The common feature of most recent plate valves is that they all use some kind of spring means to retain the porting of the respective valve seats closed. This is so despite the fact that many valve constructions are known in which the medium flowing through the valve is utilized to move the valving member. Reference may be had in this context, only as an example, to U.S. Pat. No. 1,613,145 (Trump) issued Jan. 4, 1927, U.S. Pat. No. 2,333,288 (Benzel) issued Nov. 2, 1943; U.S. Pat. No. 3,412,563 (Sharp Jr.) issued Nov. 6, 1968 and in particular U.S. Pat. No. 3,158,175 (Jaklitsch) issued Nov. 24, 1964, the latter reference relating to the compressor valves. The last mentioned reference shows that the abandonment the use springs has been subject to investigations in the field of compressor valves. Prior attempts to abandon the use of springs are described as having resulted in an untimely destruction of the valve rings. The reason for this seems to be the fact that a small delay in the disengagement of the valve ring from the damper in high speed compressor results in tremenduously high closing impact. The demolition of the valve rings is thus reported as being only a question of time. The solution in the Jaklitsch patent provides a valve in which the area of a damper member is reduced to a minimum so that the maximum surface area of the valve ring is exposed to the closing ring of the gaseous flow. The rings themselves are flat annular rings which are so designed as to provide a maximum surface area at the face of the ring turned away from the valve seat. The medium flowing through the valve is used to act predominantly on the axial surface of the ring with the resulting heavy impact of the valve ring on each closing of the valve. The idea of producing compressor valves with springless arrangement thus appears to have been subsequently abandoned, as shown by the most recent prior art arrangement described above.

SUMMARY OF THE INVENTION

It is an object of the present invention to provide further improvement in the art of compressor valves.

In general terms, the present invention provides a compressor or plate valve comprising a valve seat and a valve guard, said valve seat and valve guard being fixedly secured to each other and defining therebetween a valve chamber housing valve means arranged to allow, in one terminal position thereof, passage of gaseous medium through the valve in a first direction, said first direction being oriented from the valve seat to the valve guard, and to prevent passage through said valve in a second direction opposite to the first direction, by sealingly engaging respective groove means in the surface of the valve seat facing the valve chamber, wherein the surface of said valve guard facing said valve chamber includes support means protruding into the valve chamber in register with the respective groove means, said support means freely supporting thereon the respective valve means in a position relative to the respective groove means such that the respective valve means is in register with the respective groove means and allows free passage of gaseous medium in the first direction; said valve guard forms passage means disposed to each side of each of the valve means; and said passage means in the valve guard, said support means and said annular valve means are so arranged and disposed as to cause displacement of the valve means from the state of being freely supported on said support means into a sealing engagement with the respective annular groove means when a predetermined gas flow oriented in the second direction passes through the valve.

It is most preferred that the valve means and the groove means be of an annular configuration and that the said passage means formed in the guard be disposed to each radial side of a respective annular valve means. It is also preferred that the valve means be one or more valve rings. The valve rings are preferably symmetrical about a plane extending generally radially with respect to the ring and located centrally between the respective axial ends of the ring. The most preferred cross-sectional configuration of the valve ring is that of a V-shaped first end, a V-shaped second end and two straight sides (cylindric) disposed therebetween. The annular groove means can then be preferably provided such that their angular size corresponds to that of the axial faces of the rings.

In another aspect, the present invention provides, for use in a compressor valve of the type including a valve seat and a valve guard, said seat and guard being fixedly secured to each other and defining therebetween a valve chamber, said valve seat having annular groove means in the surface of the valve seat facing the chamber: a valve ring comprising a first axial face section and a second axial face section, said axial face sections being symmetrical with respect to a plane perpendicular to the axis of the ring and disposed centrally with respect to the axial length of the ring, each of said face sections having a first portion inclined radially and axially inwardly and a second portion inclined radially outwardly and axially inwardly.

Preferably, the face sections are each of a V-shaped cross-sectional configuration, said ring further comprising a cylindric central portion disposed between the axial face sections, whereby an annular ridge is formed at each axial end of the ring, the intermediate central portion thereof being generally cylindric.

DESCRIPTION OF A PREFERRED EMBODIMENT

Figure 3:
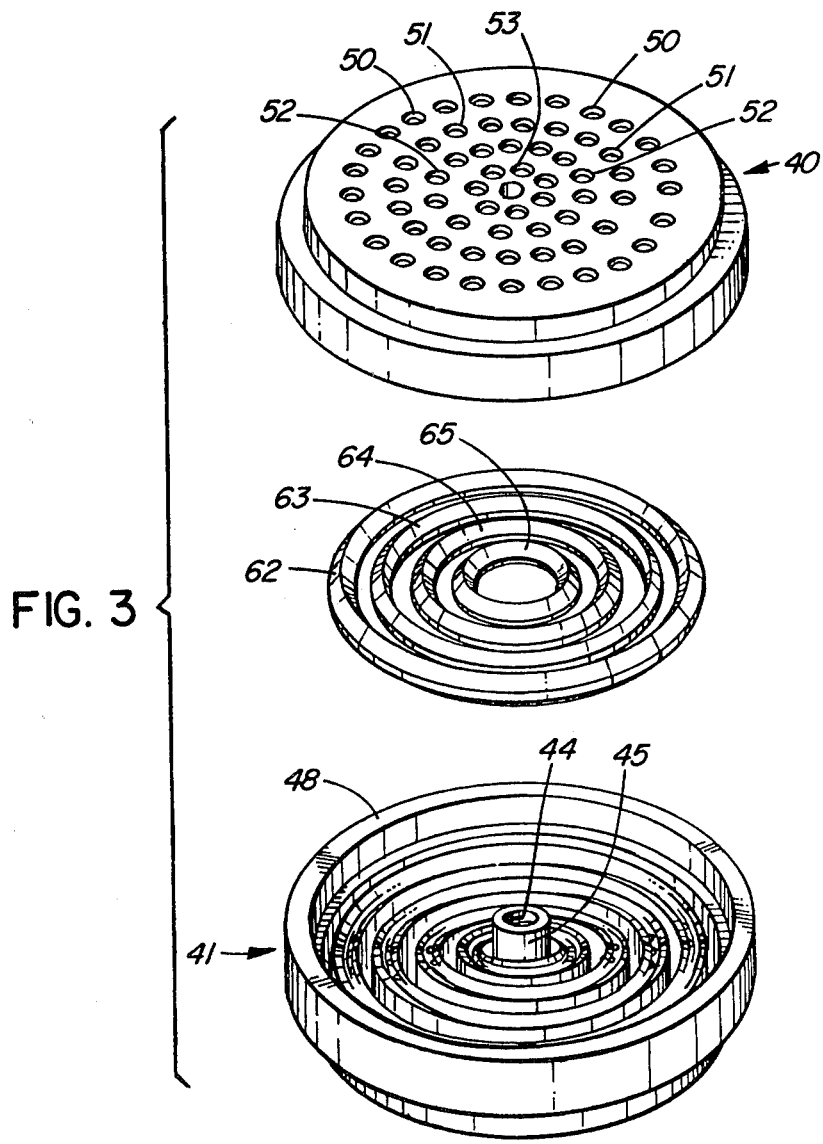
FIG. 3 is an exploded view similar to that of FIG. 1 but showing an exemplary embodiment of the compressor valve of the present invention, with certain parts omitted.

Reference may now be had to FIGS. 3-10. The valve of the present invention is comprised of a valve seat 40 and of a valve guard 41. The valve seat 40 and valve guard 41 are fixedly connected with each other by way of a securement member such as a threaded stem 42 whose head 43 is disposed centrally of the valve seat 40 at an exterior surface thereof. The threaded portion of the stem 43 is engaged in a thread 44 tapped in a cylindric central portion 45 of the valve guard 41. The top face of the central portion 45 is engaged within a recess provided at the bottom face of a central portion 46 of the valve seat 40. At the outer periphery of the valve seat 40 a shoulder section 47 is formed and the outer periphery of the valve guard 41 forms a complementary shoulder section 48 (FIG. 3). The mutually engaged portions of the shoulder sections 47 and 48 and of the central portions 45 and 46 maintain the valve seat and valve guard at a position wherein a valve chamber 49 is defined between the two parts.

As in the case of the prior art valve, the guard seat 40 is provided at the top surface thereof with a number of concentric rows of circular passages. The passages of the outermost row are designated with reference numerals 50, the next one with 51, then with 52 and the fourth row having the smallest diameter has passages 53. Each passage 50-53 communicates with a continuous annular groove at the end of the valve seat 40 facing the valve chamber 49. Thus, the series of passages 50 are maintained in communication with a groove 54, while the passages 51, 52 and 53 communicate with grooves 55, 56 and 57, respectively. The lowermost edge of each of the grooves 54-57 is bevelled at 58, 59, 60 and 61. The bevel of the shown embodiment is approximately 45°.

Disposed in register with each of the grooves 54-57 is a respective valve ring 62, 63, 64 and 65.

The valve rings 62-65 are made, in the preferred embodiment, from nylon reinforced by fiberglass fibres, the content of fiberglass fibres being approximately 30%.

Figure 8:
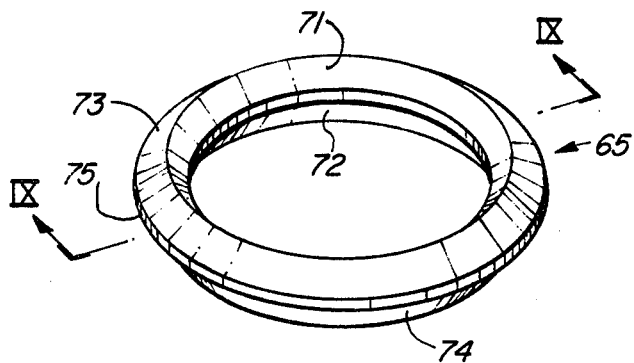
FIG. 8 is a perspective view of a valve ring according to the present invention.
Figure 9:
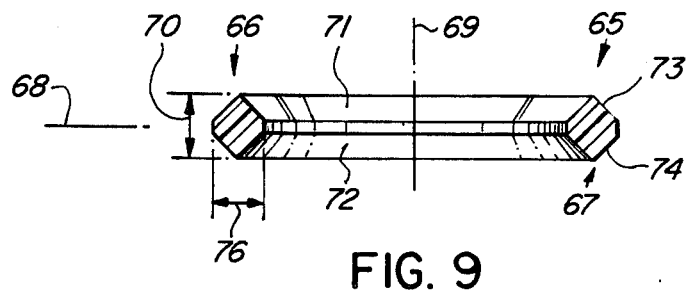
FIG. 9 is section IX—IX of FIG. 8.
Figure 10:
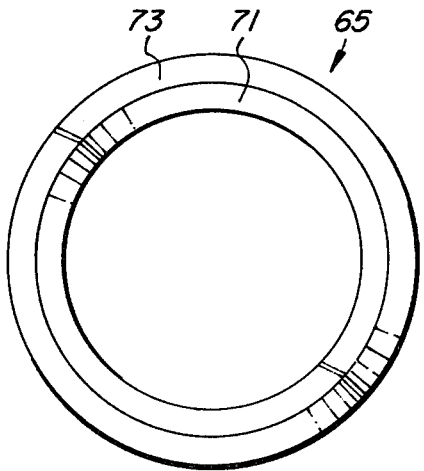
FIG. 10 is a top plan view of the bearing of FIG. 8.

As regards the structural configuration of each of the rings, this is best seen from FIGS. 8-10. Each ring 65 has a first axial face section 66 and a second axial face section 67. The axial face section 66 and 67 are symmetrical with respect to a plane 68 which is perpendicular to the axis 69 of the ring and is disposed centrally with respect to the axial length 70 of the ring. Each of the face sections 66 and 67 has a first portion 71 and 72 inclined radially and axially inwardly, and a second portion 73 and 74. The portions 73 and 74 are at an angle with respect to the portions 71 and 72, respectively, generally corresponding to the bevels 58-61 of the respective grooves 54-57. In other words, a V-shaped cross-sectional configuration is presented by each axial end of the ring. A cylindric central portion 75 is disposed between the axial face sections. Its width is designated with reference numeral 76. The angle of portions 74, 72 and 73, 71 are the same. Accordingly, it is not of essence as to which face of the individual valve rings faces the valve seat 40.

Figure 4:
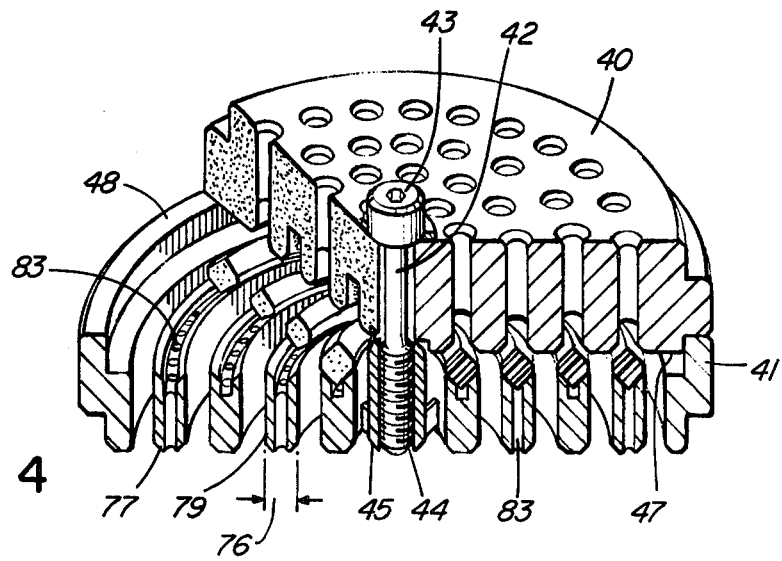
FIG. 4 is a simplified cross-sectional view similar to that of FIG. 2 but showing the valve of the present invention in an open state.

Each of the valve rings 62-65 rests on the top surface of an annular rib 77, 78, 79 and 80. The width of each of the ribs 77-80 is equal, in the preferred embodiment, to the width 76 of the cylindric portion of the respective valve ring as shown in FIG. 9. Therefore, the width of the rib 79 in FIG. 4 is referred to with the same reference numeral 76. Each of the ribs 77-78, 79, 80 has a V-shaped groove 81 in its top surface. The groove 81 being complementary with the V-shaped configuration of the respective valve ring. At the centre of each rib such as rib 80, the V-shaped groove is provided with a recess 82 which extends over the entire periphery and provides an air cushion for the respective valve ring. Each of the ribs 77-80 is further provided with a number of equidistantly spaced relieve passages 83 through which any impurities accumulated in the area of the respective V-shaped groove 81 can be removed. The concentric ribs 77-80 are so arranged that there is an annular channel to each side of each of the ribs 77-80. Thus, annular channels or passages 84, 85 is disposed one to each radial side of the rib 77. The next rib 78 is surrounded by the above passage 85 and by a next passage 86. Passages 87, 88 are disposed one to each side of the rib 80. At a location flush with the lower outer surface of the valve guard 41, three ribs 89, 90, 91 (FIG. 7) of rectangular cross-section are disposed. They serve the purpose of maintaining the ribs 77, 78, 79 and 80 at an equidistant spacing from each other and from the central portion 45 and to hold the entire guard together.

Figure 5:
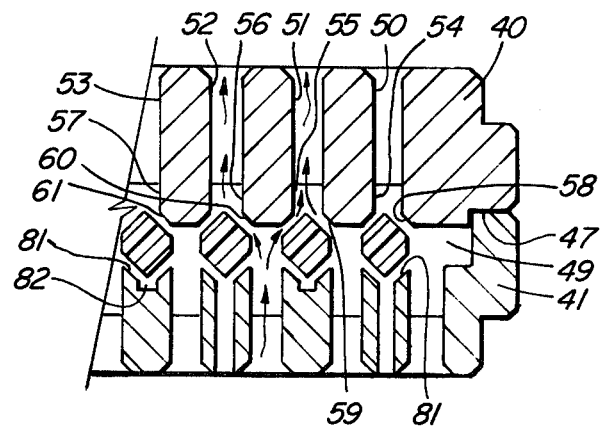
FIG. 5 is a partial cross-sectional, enlarged view similar to that of FIG. 4 but showing the valve of the present invention in an intermediate position changing from an open state to a closed state.
Figure 6:
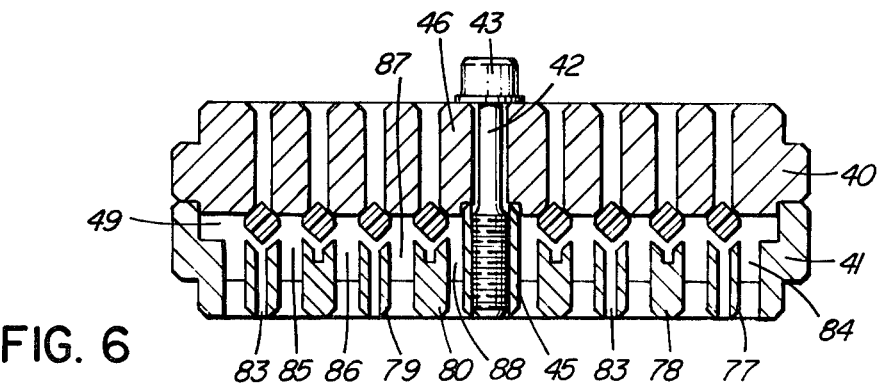
FIG. 6 is a cross-sectional view similar to that of FIG. 4 but showing the valve in a closed state.
Figure 7:
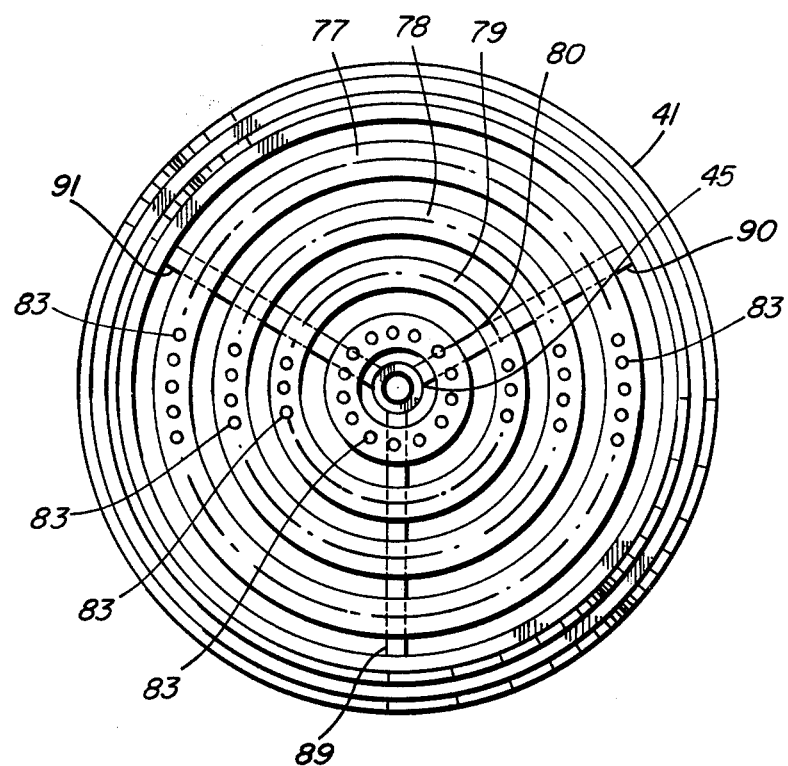
FIG. 7 is a bottom plan view of the valve as shown in FIG. 4.

Before proceeding with the description of operation of the valve according to the present invention, it is noteworthy that the drawing of the cross-sectional view of FIGS. 4, 5 and 6 are deliberately out of scale to facilitate the understanding of the operation. In particular, those skilled in the art know that the spacing between the respective rings 62-65 and the bevels 58-61 is in fact substantially less than shown. This results in the upper ridge sections of the rings 62, 63, 64 and 65 being much deeper within the respective grooves 54, 55, 56 and 57 than shown in the drawing. This feature is important since it is advantageous that the valve rings 62, while being freely moveable and unattached to any part of the valve seat 40 or valve guard 41, they are still maintained in registry each with the respective groove so that the valve can be positioned in virtually any operative position, not necessarily in that shown in the drawing of FIG. 4.

In operation and assuming that the valve of FIG. 4 is a suction or intake valve of a compressor, the open state of the valve is typical by the rings 62, 63, 64 and 65 being remote from the respective seats or bevels 58–61. Air is drawn through the passages 50, 51, 52 and 53, through the associated grooves 54, 55, 56 and 57, by the respective valve rings 62–65 and through the annular slots 84, 85, 86, 87 and 88 into the cylinder of the associated air compressor. The securement to the compressor per se is not shown and can be done by many different means known to those skilled in the art. As soon as the piston of the associated compressor reaches the lower dead point, the air previously drawn into the cylinder has the tendency to flow back through channels 84, 85, 86, 87 and 88. This flow virtually instantly lifts or displaces the valve rings 62, 63, 64 and 65 into engagement with the seats or bevels 58, 59, 60 and 61, respectively, thus sealingly engaging same and preventing further flow of air through the valve in the reverse direction. The sequence of this operation is indicated diagramatically in FIGS. 5 and 6, of which FIG. 5 shows the intermediate stage very shortly after the reversal of the movement of the piston of an associated compressor while FIG. 6 shows the valve closed.

As is well known, during the time period the valve is closed, another valve which is oriented in opposite fashion for discharge of the air from the compressor cylinder is open. As soon as the movement of the compressor piston is again reversed, the valve rings are drawn by the intake air back from the position of FIG. 6 over that of FIG. 5 to the arragement as seen from FIG. 4. The whole operation is now repeated.

Those skilled in the art will immediately appreciate that many modifications may exist of the preferred arrangement as shown without departing from the present invention. For instance, the V-shaped configuration of the axial ends of the valve rings can be substituted by semi-cylindric shape which might be associated with a different kind of the seating 58, 59, 60 and 61 in the grooves of the valve seat 40. The number of valve rings is also optional. As a matter of fact, a valve having merely a single valve ring would also be operable and is within the scope of the present invention. The arrangement of the valve ring wherein the axial faces of same are a mirror image of each other is preferred because it enables reversal of the position of the individual valve rings when one end is worn. Thus, the life of the valve ring is in fact doubled in comparison with the valve rings of prior art shown in FIG. 2. It is believed that annular valve members (rings) are the best solution for the valve members which is not to say that the valve members could not have a different shape. For instance, the basic features of the present invention as far as the valve itself is concerned are also adaptable for use in valves having straight valve members somewhat similar to those shown in Canadian Pat. No. 1,069,019 (Kucenty), issued Jan. 1, 1980. In such case, of course, the valve rings 62–65 would have to be replaced by staight rods complimentary with remaining parts of the valve.

The above are but a few examples of many other modifications of the present invention which may depart from the arrangement of the preferred embodiment described above, without departing from the present invention as recited in the accompanying claims.

We claim:

1. A compressor valve comprising a valve seat and a valve guard, said valve seat and valve guard being fixedly secured to each other and defining therebetween a valve chamber, said valve chamber having valve means disposed therein and arranged to allow, in a first position thereof, passage of gaseous medium through the valve in a first direction, said first direction being oriented from the seat to the guard, and to prevent passage of the gaseous medium through said valve in a second direction opposite to the first direction, by sealingly engaging respective annular porting groove means in that surface of the valve seat which faces the chamber, wherein (a) the surface of said valve guard facing said chamber includes annular support means protruding into the chamber and disposed co-axially with the respective groove means, said support means being adapted to freely support thereon the respective valve means in a first position relative to the respective groove means, such that the respective valve means is maintained in register with the respective groove means and allows free passage of gaseous medium in the said first direction;

(b) said valve guard forms passage means disposed to each side of the respective valve means;

(c) said passage means in the valve guard said support means and said valve means are so arranged and disposed as to cause displacement of the valve means from said first position into sealing engagement with the respective groove means by the action of the predetermined gas flow in the second direction;

(d) said valve means comprises a first face section and a second face section, said first face section being a mirror image of said second face section and facing said porting groove means and being convergent in said second direction; and (e) said valve means is a valve ring, said passage means being disposed to each radial side of the respective valve means.

2. A valve as claimed in claim 1, wherein each valve ring is symmetrical about a plane extending generally radially with respect to the ring and located centrally between axial ends of the ring.

3. A valve as claimed in claim 2, wherein the valve means includes a valve ring having a cross-sectional configuration comprising an axially outwardly convergent V-shaped first end, an axially outwardly convergent V-shaped second end and two straight sides corresponding to cylindric surfaces disposed therebetween.

4. A valve as claimed in claim 3, wherein the annular groove means is of angular size complementary with that of one axial face of the respective rings.

5. A valve as claimed in claim 3, wherein the support means is formed by a concave, V-shaped groove and the width of the annular ring as measured between the said cylindric surfaces is generally equal to the maximum width of the V-shaped groove, said V-shaped groove being provided in an axial face of an annular rib protruding axially into the valve chamber, whereby the cylindric sides of the valve ring are exposed to the flow of the gaseous medium passing through the valve in said second direction.

6. A valve as claimed in claim 1, wherein the support means for the ring is formed by a generally continuous concave groove of V-shaped cross-sectional configuration disposed at an inner axial end of a respective annular rib forming a part of the guard, the width of the respective annular rib being generally equal to the thickness of the ring, whereby virtually no part of the face of the ring is exposed when the ring is engaged in said concave groove.

7. A valve as claimed in claim 6, wherein the V-shaped groove is recessed at a bottom central portion to provide air cushion for the ring.

8. A valve as claimed in claim 1, wherein the annular groove means, the support means and the valve ring or rings are so arranged that the axial end of each valve ring, when the latter is supported by a respective support, is partly within the associated annular groove to prevent radial displacement of the ring from a position in which the ring is in register with the respective annular groove while maintaining the respective ring force of attachment to the valve seat and the valve guard.

9. For use in a compressor valve of the type including a valve seat and a valve guard, said seat and guard being fixedly secured to each other and defining therebetween a valve chamber, the valve further having annular groove means in that surface of the guard which faces the chamber:

a valve ring comprising a first axial face section and a second axial face section, said axial face sections being symmetrical with respect to a plane perpendicular to the axis of the ring and disposed centrally with respect to the length of the ring as determined by the distance between said face sections, each of said face sections having a first portion inclined, relative to said axis of the ring, radially inwardly and toward said plane, and a second portion inclined radially outwardly and toward said plane.

10. A valve ring as claimed in claim 1, wherein the face sections are each of a generally convex, V-shaped cross-sectional configuration, said ring further comprising a cylindric central portion disposed between the axial face sections.

* * * * *